United States Patent
Radke et al.

(10) Patent No.: US 9,702,305 B2
(45) Date of Patent: Jul. 11, 2017

(54) MULTIPLE ENGINE SEQUENCER

(71) Applicant: Micron Technology, Inc., Boise, ID (US)

(72) Inventors: William H. Radke, Los Gatos, CA (US); Laszlo Borbely, Santa Clara, CA (US); David Christopher Pruett, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 933 days.

(21) Appl. No.: 13/864,413

(22) Filed: Apr. 17, 2013

(65) Prior Publication Data
US 2014/0316684 A1    Oct. 23, 2014

(51) Int. Cl.
  *G06F 9/00* (2006.01)
  *G06F 9/44* (2006.01)
  *F02D 25/00* (2006.01)
  *G06F 13/16* (2006.01)

(52) U.S. Cl.
  CPC ......... *F02D 25/00* (2013.01); *G06F 13/1668* (2013.01)

(58) Field of Classification Search
  None
  See application file for complete search history.

(56) References Cited

U.S. PATENT DOCUMENTS

| | | | |
|---|---|---|---|
| 4,876,643 A | 10/1989 | McNeill et al. | |
| 4,953,082 A | 8/1990 | Nomura et al. | |
| 5,036,453 A * | 7/1991 | Renner | G06F 15/8015 712/16 |
| 5,487,146 A * | 1/1996 | Guttag | G09G 5/393 345/519 |
| 6,298,370 B1 * | 10/2001 | Tang | G06F 9/5044 718/100 |
| 6,578,101 B1 * | 6/2003 | Ahern | G06F 13/4045 370/402 |
| 6,748,509 B2 * | 6/2004 | Litaize | G06F 12/0813 711/170 |
| 6,977,852 B2 | 12/2005 | Naso et al. | |
| 7,272,683 B2 | 9/2007 | De Santis et al. | |
| 7,420,849 B2 | 9/2008 | De Santis et al. | |
| 7,600,068 B2 | 10/2009 | Chalopin et al. | |
| 7,924,767 B2 * | 4/2011 | Hoyt | H04L 69/22 370/328 |
| 8,019,972 B2 | 9/2011 | Vavro et al. | |
| 8,738,860 B1 * | 5/2014 | Griffin | G06F 12/0897 711/122 |
| 2003/0028733 A1 * | 2/2003 | Tsunoda | G06F 12/0638 711/154 |

(Continued)

OTHER PUBLICATIONS

De Santis, et al.; "Memory Controllers", U.S. Appl. No. 13/560,279, filed Jul. 27, 2012; Total pp. 24.

*Primary Examiner* — Michael Sun
(74) *Attorney, Agent, or Firm* — Dicke, Billig & Czaja, PLLC

(57) ABSTRACT

Multiple engine sequencers in memory interfaces are disclosed. Individual sequencer engines of multiple engine sequencers perform at least portions of their respective operations in parallel with other individual sequencer engine operations performed in the memory interface. In at least one embodiment, sequencer engine operations are performed at least partially concurrently with other sequencer engine operations in the memory interface.

50 Claims, 7 Drawing Sheets

(56) References Cited

U.S. PATENT DOCUMENTS

| | | | |
|---|---|---|---|
| 2004/0260891 A1* | 12/2004 | Jeddeloh | G11C 7/1006 711/154 |
| 2005/0172085 A1* | 8/2005 | Klingman | G06F 9/505 711/154 |
| 2007/0124532 A1* | 5/2007 | Bennett | G06F 13/1684 711/100 |
| 2007/0276976 A1* | 11/2007 | Gower | G06F 13/4243 710/305 |
| 2007/0300018 A1* | 12/2007 | Campbell | G06F 13/1673 711/149 |
| 2009/0019184 A1* | 1/2009 | Skerlj | G06F 13/1684 710/5 |
| 2010/0023682 A1* | 1/2010 | Lee | G06F 12/0246 711/103 |
| 2011/0145510 A1* | 6/2011 | Woffinden | G06F 12/0808 711/141 |
| 2011/0145546 A1* | 6/2011 | Woffinden | G06F 12/08 712/30 |

* cited by examiner

MULTIPLE ENGINE SEQUENCER

TECHNICAL FIELD

The present disclosure relates generally to memory and in particular, in one or more embodiments, the present disclosure relates to memory sequencers.

BACKGROUND

Memory devices are typically provided as internal, semiconductor, integrated circuits in computers or other electronic systems. There are many different types of memory including random-access memory (RAM), read only memory (ROM), dynamic random access memory (DRAM), synchronous dynamic random access memory (SDRAM), double data rate memory (DDR), low power double data rate memory (LPDDR), phase change memory (PCM) and Flash memory.

Volatile memory is memory which can retain its stored data as long as power is applied to the memory. Non-volatile memory is memory that can retain its stored data for some extended period without the application of power. Flash memory devices have developed into a popular source of non-volatile memory for a wide range of electronic applications. Flash memory devices are commonly used in electronic systems, such as personal computers, personal digital assistants (PDAs), digital cameras, digital media players, digital recorders, games, appliances, vehicles, wireless devices, cellular telephones, and removable memory modules, and the uses for Flash memory continue to expand.

The demand for higher operating speeds and greater storage capacity in memory devices continues to increase. This demand is accompanied by a need for a reduction in operational delays, such as data latency of data propagating within electronic systems, in order to facilitate the desired increase in operating speed. Factors which can affect data latency in electronic systems include serially performed (e.g., executed) operations including these operational delays performed within the electronic system. Data latency and other delays in completing these serially executed operations can be cumulative and undesirable in light of the demand for improving performance of electronic systems. For example, a delay might be incurred between the time of initiating a particular memory operation, such as a data read memory operation, and when read data actually becomes available. These delays result in what is sometimes referred to as "dead time" or "dead cycles." This dead time can be undesirable in that it reduces the overall speed of the memory device.

For the reasons stated above, and for other reasons stated below which will become apparent to those skilled in the art upon reading and understanding the present specification, there is a need in the art for reducing delays, such as data latency delays, in electronic systems such as systems having memory devices.

DETAILED DESCRIPTION

Figure 1:
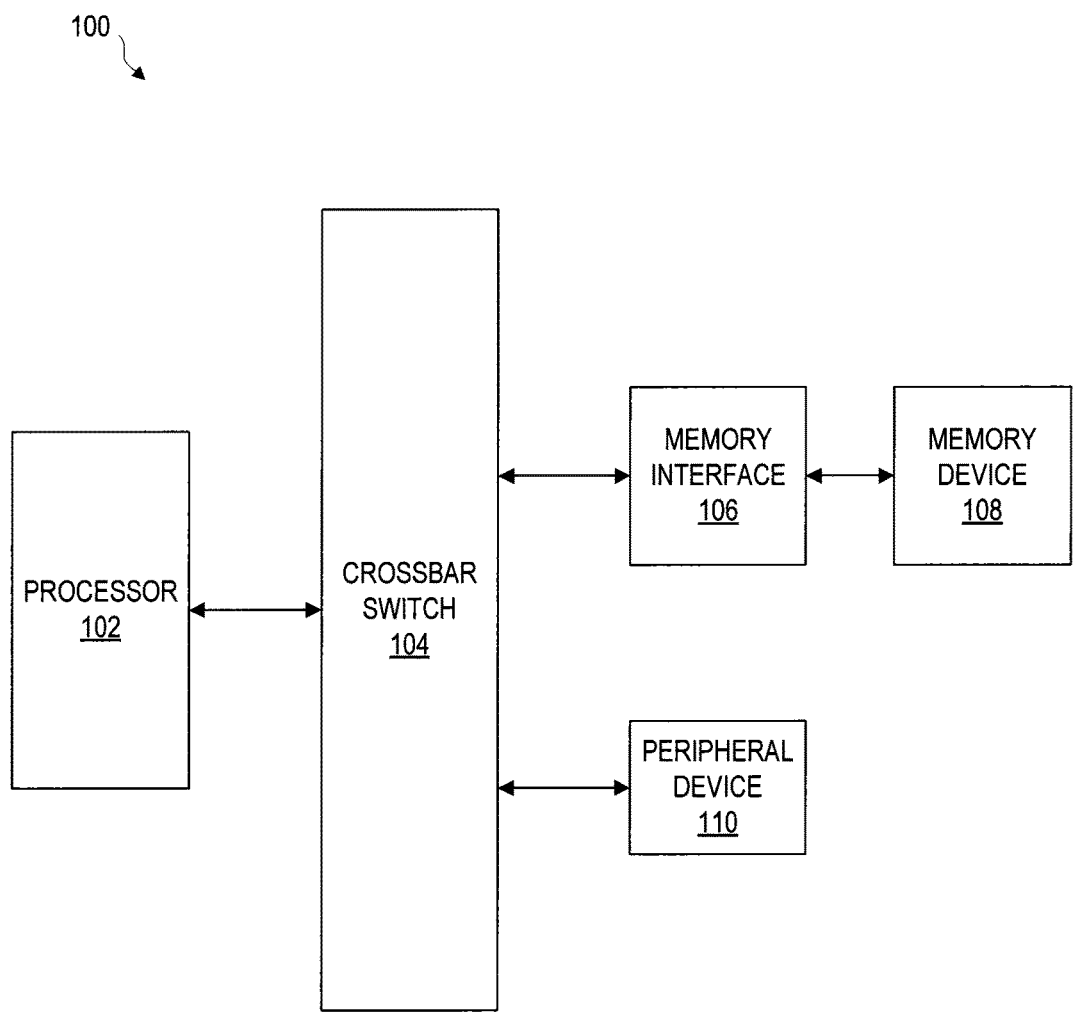
FIG. 1 is a simplified block diagram of a typical memory system.

In the following detailed description of the invention, reference is made to the accompanying drawings that form a part hereof, and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

FIG. 1 illustrates a simplified block diagram of an typical electronic system 100 having one or more memory devices. A processor 102, such as a microprocessor or other controlling circuitry is shown coupled to a crossbar switch 104. Crossbar switch 104 facilitates coupling a number of devices to the processor 102, for example. One or more memory devices 108 are coupled to the crossbar switch 104 by way of a memory interface 106. The crossbar switch 104 might have additional components 110 (e.g., peripherals) coupled to it. The processor 102, crossbar switch 104, memory interface 106 and memory device 108 form part of the electronic system 100.

Memory operations, such as memory read and memory write operations, are performed at least in part by executing a number of specific operations within the memory interface 106 to facilitate performing a memory operation in the memory device 108. These operations are serially executed in the memory interface and typically each comprise a number of serially executed steps. The memory interface 106 comprises what is sometimes referred to as a single threaded execution engine. The single threaded execution engine serially executes operations in the memory interface 106 to facilitate performing memory operations in the memory device 108. Each operation is initiated and completed before another operation is initiated and performed. As discussed above, the execution of these serially performed operations can include some amount of delay, such as data latency or dead time, for example. The cumulative effect of these delays occurring in the serially performed operations can reduce the performance of the memory device.

Figure 2:
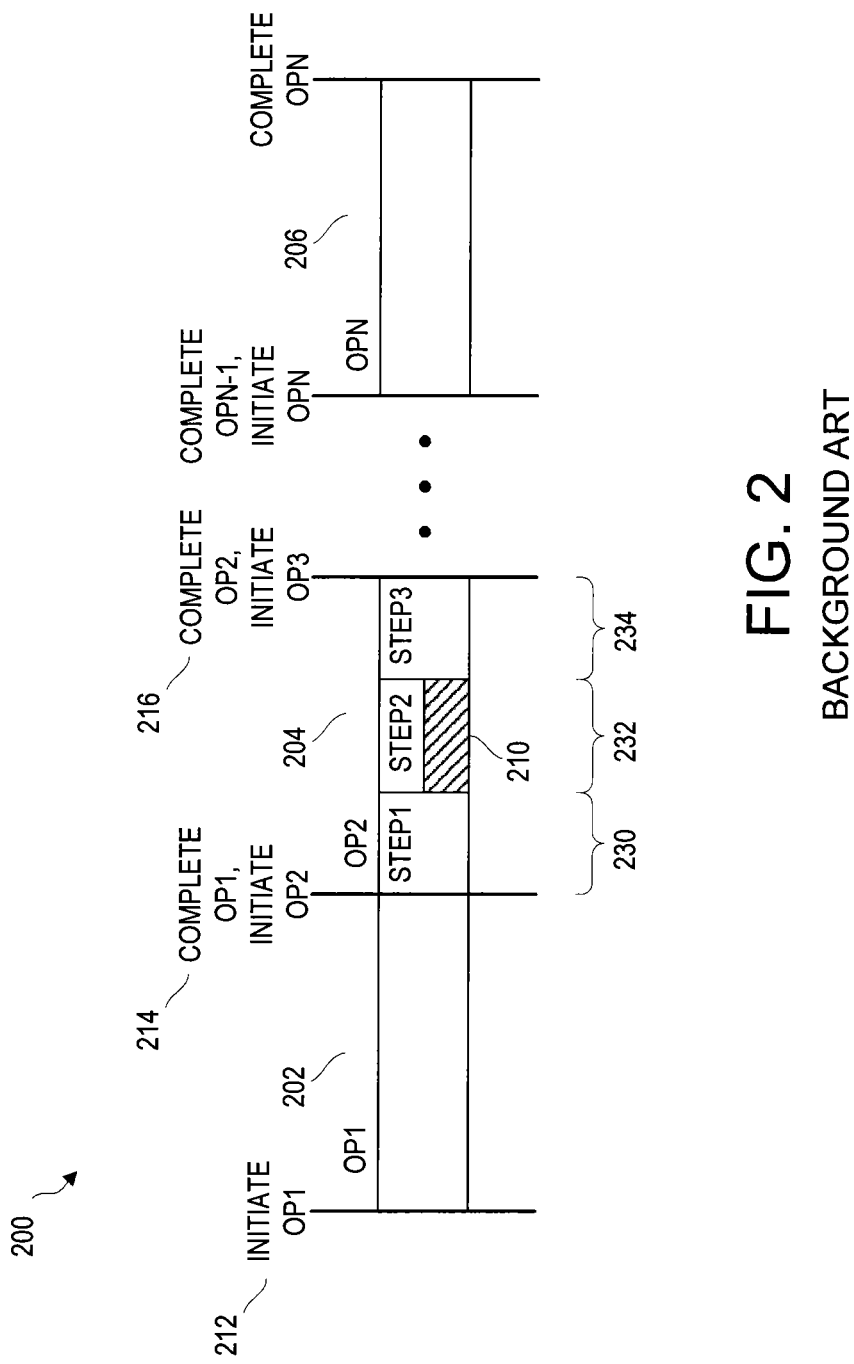
FIG. 2 illustrates a graphical representation of a typical sequence of operations of a memory interface.

A typical memory operation might include a read or write operation to be performed in the memory device 108. FIG. 2 illustrates a timing diagram 200 representative of sequentially executing a number of operations in the memory interface 106, such as to facilitate performing a read operation in the memory device 108 shown in FIG. 1, for example. Each of the serially executed operations OP1-OPN 202-206 shown in FIG. 2 might comprise a number of sequential steps, such as STEP1-STEP3 230-234, for example. The plurality of serially executed operations OP1-OPN 202-206 are performed by the single threaded execution engine of memory interface 106 shown in FIG. 1. For example, OP1 202 is initiated 212 and completed 214 before OP2 204 is initiated 214 and completed 216. In one or more of the steps comprising the operations of the typical memory interface read operation there exists a delay (e.g., data latency) 210. Although the delay 210 is shown only in STEP2 of OP2 204 of FIG. 2, steps other than STEP2 of OP2 might also comprise delays, such as in steps comprising OP1 202 and/or OP2 204, for example. As discussed above, these delays (e.g., dead cycles) become cumulative as each operation is initiated and completed before initiating the next operation in the serially executed plurality of operations.

Referring again to FIG. 1, the processor 102 might issue a read command indicative of a read operation to be performed in the memory device 108 of the electronic system 100. This read command might be transferred to the memory interface 106 through the crossbar switch 104. The memory interface 106 initiates performing a number of serially performed operations to facilitate performing the read operation in the memory device 108. As discussed above, there exists one or more delays (e.g., data latency) from when the memory interface 106 receives the read command and when the desired data becomes available. This is sometimes referred to as data read latency. For example, these delays might be on the order of hundreds of cycles (e.g., clock cycles, system clock cycles, etc.) between when the request for data was made (e.g., when the read command was received by the memory interface 106) and when the requested data becomes available from the memory device to begin transferring from the memory interface 106 to the crossbar switch 104 and to the processor 102 which requested the data. Write data latency, such as the delay of providing data to be stored in memory and the initiation of the actual storage of data in a memory device 108, might be on the order of thousands of cycles, for example.

Typical memory interfaces, such as memory interface 106, wait for these delays (e.g., data latency) to pass during the execution of the serially executed operations and individual steps comprising each operation. For example, during a typical read operation, the memory interface 106 might initiate the request for data to be read from the memory device 108 in response to a read command received from the processor 102 by way of the crossbar switch 104. The memory interface 106 might have to wait 150 cycles until the requested data becomes available to be sent to the processor 102 by way of the crossbar switch 104. Thus, waiting these 150 cycles results in "dead cycles" which reduces the overall performance of the memory system.

Figure 3:
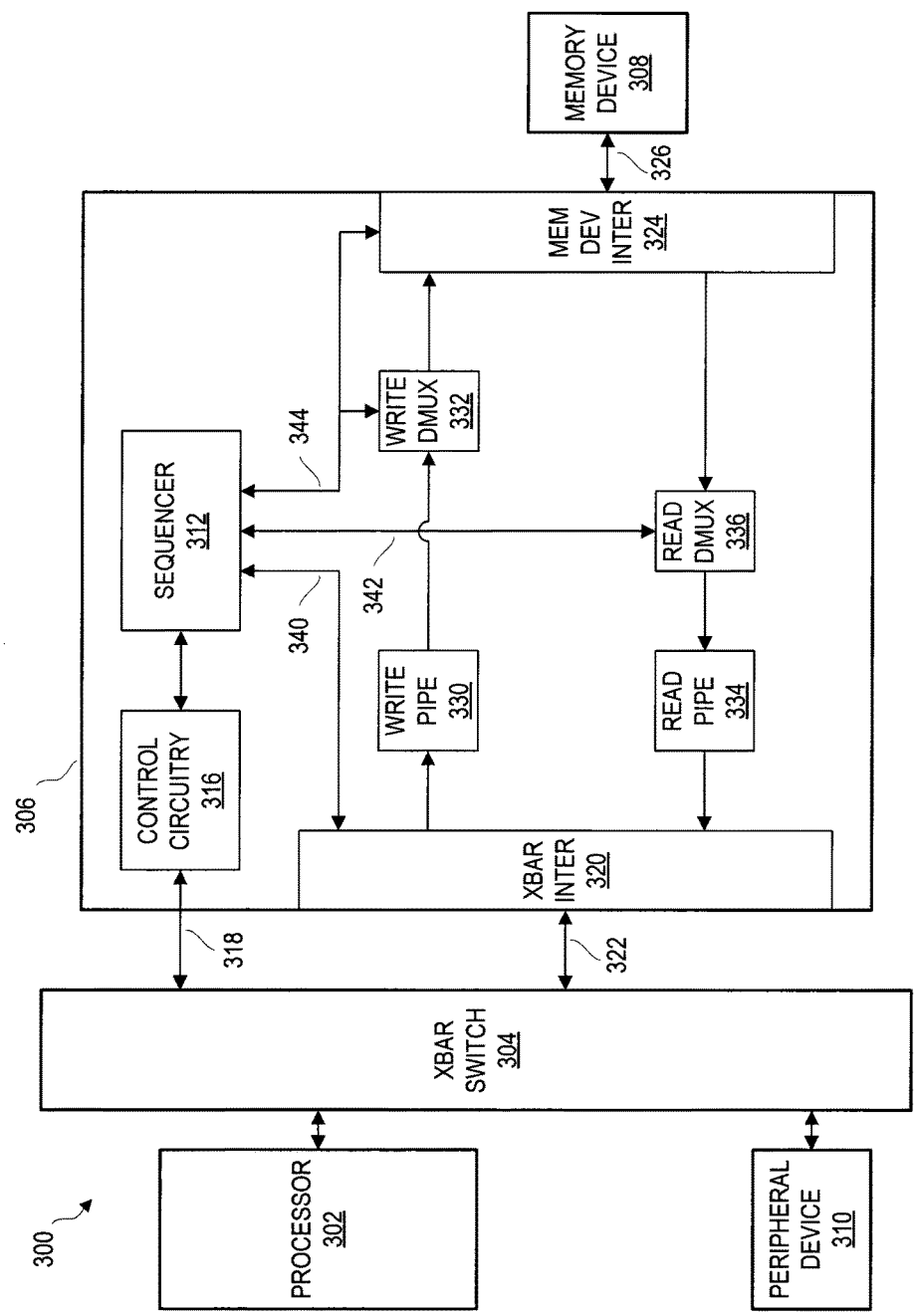
FIG. 3 is a simplified block diagram of an electronic system including a memory interface according to an embodiment of the present disclosure.

FIG. 3 illustrates a simplified block diagram of an electronic system 300 comprising a memory interface 306 according to an embodiment of the present disclosure. The memory interface 306 is coupled to a crossbar (XBAR) switch 304. The memory interface 306 comprises a sequencer 312 (e.g., multiple engine sequencer) according to an embodiment of the present disclosure. The multiple engine sequencer (MES) 312 provides for concurrently performing one or more operations within the memory interface 306, such as in facilitating a memory operation performed in a memory device 308 coupled to the memory interface, for example. One or more additional devices 310 (e.g., peripheral devices) might be coupled to the crossbar switch 304.

The memory device 308 is coupled to a memory device interface (MEM DEV INTER) 324 of the memory interface 306 by a communications channel (e.g., bus) 326. Although only one memory device 308 is shown in FIG. 3, one or more embodiments might comprise multiple memory devices 308 coupled to the memory device interface (MEM DEV INTER) 324 by one or more a communications channels 326, for example. The memory device 308 might include one or more arrays of memory cells (not shown.) Memory device 308 might comprise NAND flash memory cells, NOR flash memory cells, PCM memory cells, DDR memory or LPDDR memory cells, for example. The memory arrays of memory device 308 might include multiple banks and blocks of memory cells residing on a single or multiple die as part of the memory device 308.

Flash memory devices typically use a one-transistor memory cell that allows for high memory densities, high reliability, and low power consumption. Changes in threshold voltage of the cells, through programming of a charge storage structure, such as floating gates or trapping layers or other physical phenomena, determine the data state of each cell. Flash memory devices typically require relatively large voltages for programming and erasing operations. For example, a Flash memory device may have a supply voltage (e.g., Vcc) of 3V but require a voltage (e.g., Vpgm) of 15V or higher to be used during programming and/or erase operations on the array of memory cells. However, a sense (e.g., read) operation of Flash memory might only require voltages of Vcc or less, for example.

Memory device 308 might comprise a PCM memory device. PCM is a resistive memory technology that can provide non-volatile storage. PCM, as the name implies, uses the change in resistance of a material when it changes phase in order to store data in a non-volatile manner. For example, an alloy of different elements might change from a crystalline phase having a low resistance to an amorphous phase having a high resistance. When the material exhibits multiple distinctly different resistances, each different resistance can then be assigned a respective data value (e.g., 00, 01, 10, 11).

The one or more memory devices 308 might comprise other types of memory devices such as a dynamic random access memory (DRAM) device, a synchronous dynamic random access memory (SDRAM) device, a double data rate memory (DDR) device and/or a low power double data rate memory (LPDDR) device, for example. The one or more memory devices 308 might comprise a combination of volatile and non-volatile memory.

The multiple engine sequencer 312 at least partially facilitates performing memory device operations in memory device 308 according to various embodiments of the present disclosure. Sequencer 312 might comprise Random Access Memory (RAM) memory (not shown.) Memory interface 306 further comprises control circuitry 316. Control circuitry 316 might be configured to manage various operations within the memory interface 306. Control circuitry 316 might be coupled to the crossbar switch 304 to send and receive various data (e.g., commands or user data) across one or more communications channels 318 (e.g., communications bus.) Control circuitry 316 might further be coupled to additional components of the memory interface 306 (not shown).

Memory interface 306 further comprises crossbar interface (XBAR INTER) circuitry 320. The crossbar interface circuitry 320 facilitates communication between the memory interface 306 and the crossbar switch 304. The crossbar interface circuitry 320 might be coupled to the crossbar switch 304 by one or more signal lines 322, such as comprising one or more communications channels (e.g., communications bus), for example.

Memory interface 306 further comprises a memory device interface (MEM DEV INTER) 324 configured to facilitate communication with one or more memory devices 308 (e.g., memory modules.) For example, one or more NAND flash memory modules 308 might be coupled to the memory device interface 324 according to one or more embodiments of the present disclosure. According to at least one embodiment, memory device interface 324 comprises an Open NAND Flash Interface (ONFI). The memory device interface 324 might be coupled to the memory modules 308 over a communications bus 326, for example.

Memory interface 306 further comprises a pathway for transferring data, such as part of a memory write operation, for example. This pathway between the crossbar interface 320 and the memory device interface 324 can be referred to as a write pipeline 330 (e.g., write pipe), for example. The transfer of data between the crossbar interface 320 and the memory device interface 324 might further be facilitated by a write demultiplexor (DMUX) 332. Sequencer 312 is coupled to the write DMUX 332 and provides one or more control signals as inputs to the write DMUX, such as to facilitate performing a memory write operation to be performed in the memory device 308, for example. During a memory write operation, data is provided at the crossbar interface 320 where it is transferred to the memory device interface 324 by way of the write pipe 330 and write DMUX 332 at least partially under the control of the sequencer 312. Data is then transferred from the memory device interface 324 to the memory device 308 over the communications bus 326.

Memory interface 306 further comprises a read pipeline (e.g., read pipe) 334 to transfer data from the memory device interface 324 to the crossbar interface 320, such as data read from the memory device 308, for example. The data is transferred from the memory device interface 324 to the crossbar interface 320 by way of the read demultiplexor (DMUX) 336 and the read pipe 334. The read DMUX 336 is provided control signals from the sequencer 312 to facilitate a memory read operation, for example. During a memory read operation, a request for data is transferred to the memory device 308 identifying the requested data to be read. The requested data is read from the memory module 308 and is transferred over the communications bus 326 to the memory device interface 324. The data read is transferred from the memory device interface 324 to the crossbar interface 320 by way of the read DMUX 336 and the read pipe 334. From the crossbar interface 320, the requested read data is sent to the processor 302 by way of the crossbar switch 304, for example.

As discussed above, there may exist one or more delays from the initiation of a memory device operation, such as a read or write operation, to when the data is available for the requested operation. For example, the processor 302 might generate a memory read command which is provided through the crossbar switch 304 to the memory interface 306. The read command propagates through the memory interface 306 and is sent to the memory module 308 by way of the memory device interface 324 and communications bus 326. The delay from the read command being received at the crossbar interface 320 and when the requested data from the memory device 308 arrives at the crossbar interface 320 via the read pipe 334 and read DMUX 336 might be referred to as data latency (e.g., data read latency.) Data latency might also occur within the write pipe 330 (e.g., data write latency), such as during a write operation. Data to be written to the memory device 308 will take some amount of time (e.g., number of clock cycles) to traverse the crossbar interface 320, write pipe 330 and write DMUX 332, memory device interface 324 and bus 326, resulting in write data latency, for example.

Figure 4:
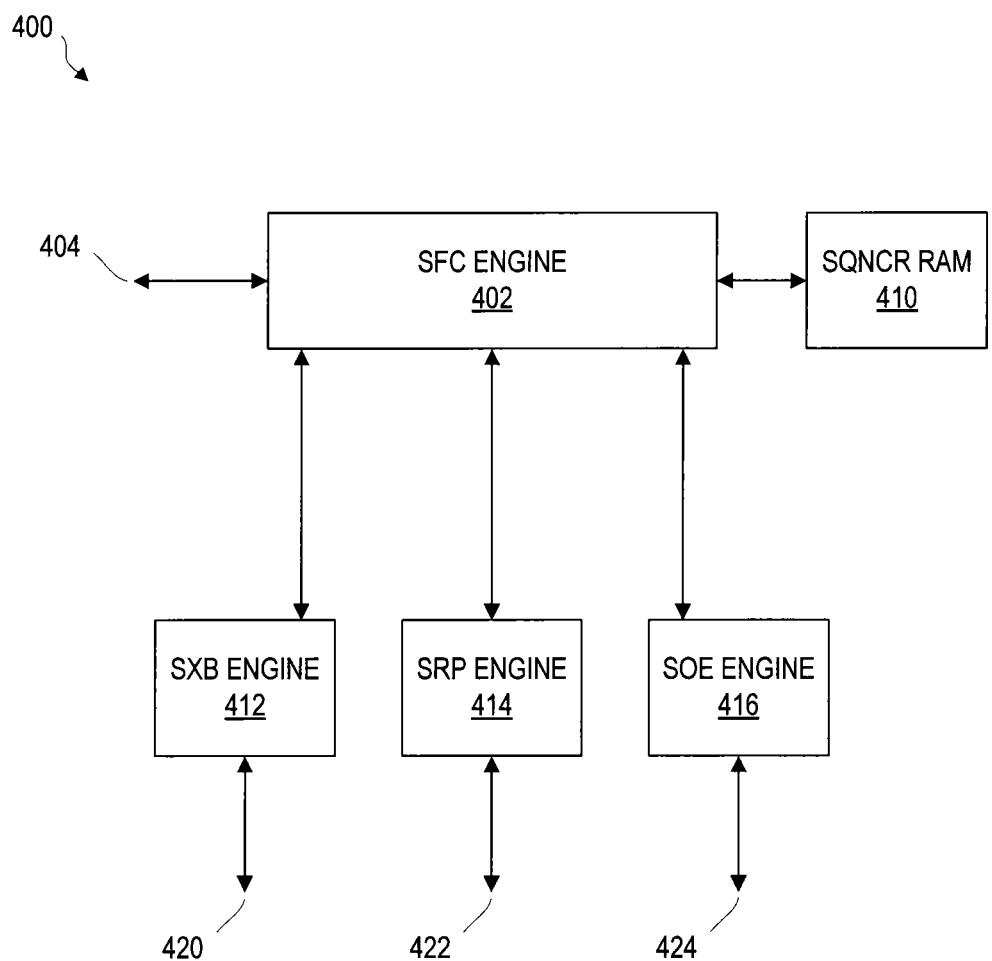
FIG. 4 is a block diagram representation of a multiple engine sequencer of a memory interface according to an embodiment of the present disclosure.

FIG. 4 illustrates a functional block diagram of a multiple engine sequencer 400, such as sequencer 312 of memory interface 306 shown in FIG. 3, according to various embodiments of the present disclosure. Sequencer 400 comprises multiple sequencer engines that are configured to execute different operations to facilitate performing various memory device operations in memory devices 308 coupled to the memory interface 306, for example. The sequencer engines of sequencer 400 are configured to concurrently perform at least a portion of various operations in the memory interface 306.

FIG. 4 illustrates four sequencer engines comprising the multiple engine sequencer 400. However, various embodiments according to the present disclosure are not limited to comprising four sequencer engines. Sequencer 400 includes a Flow Control (e.g., Sequencer Flow Control) engine 402. The Sequencer Flow Control (SFC) engine 402 might be configured to perform a number of operations such as branch operations, jump operations and comparisons, for example. The SFC engine 402 might comprise read and/or write registers (not shown). The SFC engine 402 is further configured to receive data (e.g., commands) and to output data, such as to the control circuitry 316 shown in FIG. 3, by way of one or more signal lines (e.g., bus) 404. Commands received over bus 404 might comprise commands for specific operations to be performed. The SFC engine 402 determines if a memory operation corresponding to a received command should be executed by operations performed by the SFC engine or if performance of at least a portion of the memory operation should be delegated to a different sequencer engine of the multiple engine sequencer 400. The SFC engine might be configured to selectively activate (e.g., enable) engines of the sequencer to initiate performing their respective operations. The SFC engine might be further configured to inhibit engines from completing their respective operations after those operations have been initiated.

The multiple engine sequencer 400 further comprises RAM memory (SQNCR RANI) 410. Sequencer RAM 410 stores data (e.g., instructions) which might be accessed by the SFC engine 402 in determining and facilitating operations to be performed in the multiple engine sequencer 400 in response to commands received over bus 404. The sequencer RAM 410 might be programmed during initialization of the system, such as during or following a boot operation, including a reset of the electronic system 300, for example. The instructions stored in sequencer RAM 410 might be tailored to different types of memory which might be coupled to the memory device interface, such as memory device 308 coupled to memory device interface 324 shown in FIG. 3. For example, the instructions programmed into the sequencer RAM 410 may comprise particular instructions for executing operations in the memory interface 306 corresponding to different types of memory which might be coupled to the memory device interface 324, such as flash memory, PCM memory, DDR memory or LPDDR memory, for example. Thus, the multiple engine sequencer 400 according to one or more embodiments comprises a programmable multiple engine sequencer.

Multiple engine sequencer 400 further comprises additional sequencer engines, such as a Sequencer Crossbar Engine (SXB) 412, a Sequencer Read Pipe Engine (SRP) 414 and a Sequencer ONFI Engine (SOE) 416. Multiple engine sequencer 400 might comprise additional and/or different sequencer engines than those shown in FIG. 4 according to various embodiments of the present disclosure. The SXB engine 412, SRP engine 414 and SOE engine 416 are each configured to be activated by the SFC engine 402 and to perform operations, such as controlling specific circuitry in the memory interface 306 shown in FIG. 3.

Referring to FIGS. 3 and 4, the SXB engine 412 directs the crossbar interface 320 to facilitate a transfer of data into and/or out of the memory interface 306 by way of the crossbar interface 320. The signal line 420 shown in FIG. 4 might correspond to the signal line 340 shown coupled to the crossbar interface 320, for example. The SRP engine 414 facilitates transferring data across the read DMUX 336 and the read pipe 334 of the memory interface 306. The signal line 422 shown in FIG. 4 might correspond to the signal line 342 shown in FIG. 3. The SOE engine 416 interacts with the memory device interface 324 to direct various operations at the memory device interface 324. The signal line 424 shown in FIG. 4 might correspond to the signal line 344 shown in FIG. 3. The SOE engine 416 further interacts with the write DMUX 332 to direct transferring data across the write pipe 330 according to one or more embodiments of the present disclosure, for example.

As discussed above, the SFC engine 402, SXB engine 412, SRP engine 414 and SOE engine 416 comprise a multiple engine sequencer 400 according to various embodiments of the present disclosure. These sequencer engines are configured to perform their respective operations at least partially in parallel with one or more of the other sequencer engines. This is in contrast to typical memory interfaces comprising a single threaded execution engine where operations are performed in a serial manner. A typical single threaded execution engine initiates and completes a particular operation before initiating another operation, such as discussed above with respect to FIG. 2, for example. This is in contrast with various embodiments of the present disclosure wherein the individual sequencer engines of the multiple engine sequencer 400 are configured to perform operations at least partially in parallel (i.e., at least partially concurrently) with one or more other sequencer engines of the multiple engine sequencer 400.

Figure 5:
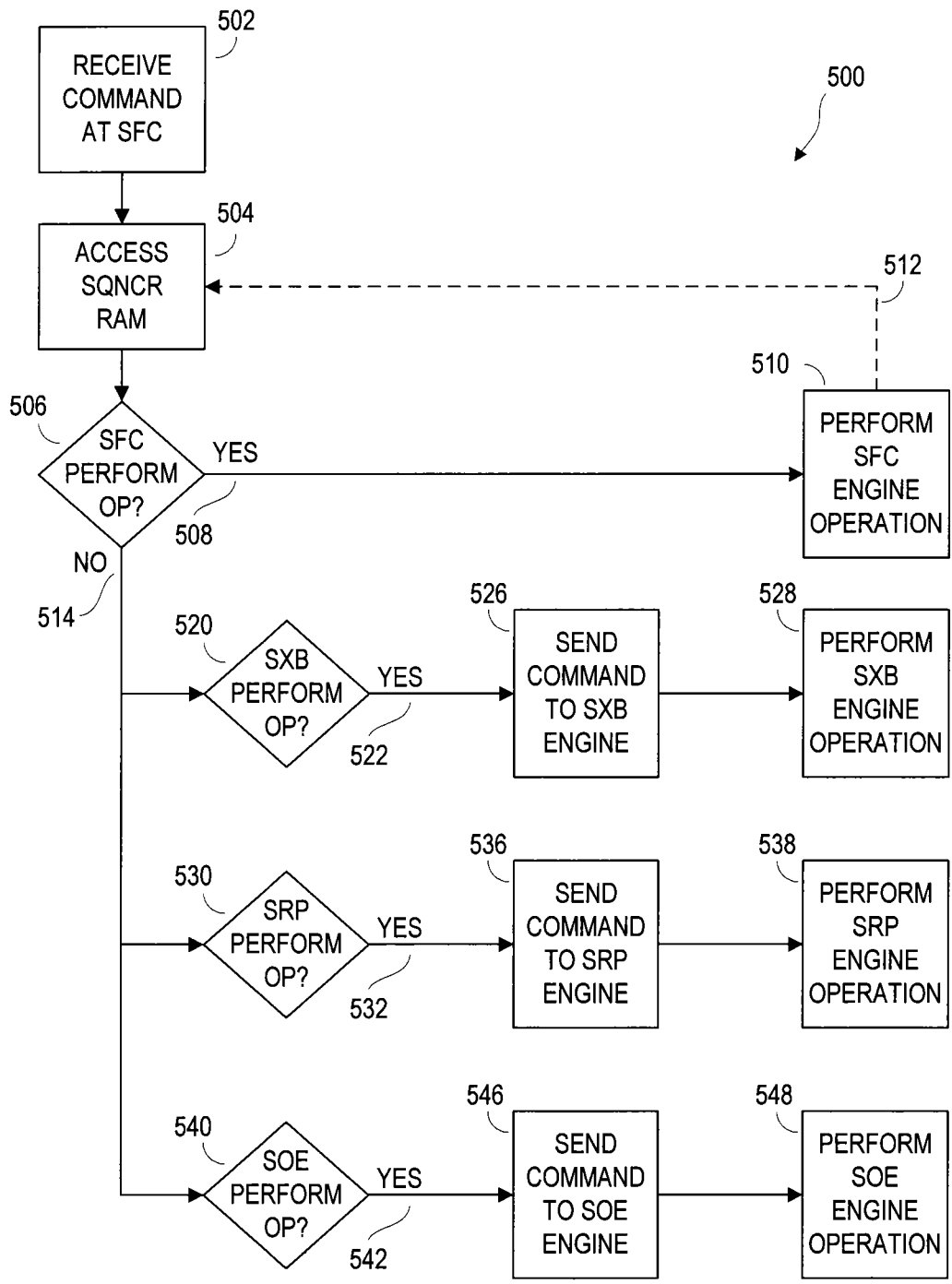
FIG. 5 illustrates a flowchart of operating a multiple engine sequencer according to an embodiment of the present disclosure.

One or more embodiments according to the present disclosure might be described by way of example and reference to FIGS. 3, 4 and 5. FIG. 5 illustrates a flow chart 500 of one or more multiple engine sequencer operations according to an embodiment of the present disclosure. A particular command might be received 502 by the SFC engine, such as SFC engine 402 shown in FIG. 4, for example. The particular command might comprise a command corresponding to one or more memory device operations, such as a read or write operation to be performed in a memory device 308 coupled to the memory interface 306 shown in FIG. 3. For example, processor 302 might issue a command to perform a read operation in the memory device 308. The SFC engine might access 504 the sequencer RAM 410 to obtain particular data (e.g., instructions) for performing one or more operations responsive to the received command 502.

The SFC engine determines 506/520/530/540 which of the sequencer engines of the multiple engine sequencer 400 will perform one or more operations in response to the received read command 502. The SFC engine might determine 506 that the SFC engine will perform one or more operations 508 responsive to the received read command 502. Thus, the SFC engine might perform one or more operations 510 responsive to instructions obtained from the sequencer RAM. According to one or more embodiments, the SFC engine might access the sequencer RAM 504 subsequent to performing 512 the SFC engine operation 510, such as to determine if additional operations are to be performed responsive the received command 502, for example. The SFC engine might further determine that one or more of the other sequencer engines might perform operations responsive to the received read command 502.

If it is determined 520 that the SXB engine 412 will perform 522 one or more operations in response to the received read command 502, the SFC engine might generate one or more commands to send 526 to the SXB engine. The SXB engine is configured to initiate and perform one or more particular operations 528 in response to the command sent from the SFC engine 526. If it is determined 530 that the SRP engine 414 will perform 532 one or more operations in response to the received command 502, the SFC engine might generate one or more commands to send 536 to the SRP engine. The SRP engine is configured to initiate and perform one or more particular operations 538 in response to the command sent from the SFC engine 536. If it is determined 540 that the SOE engine 416 will perform 542 one or more operations in response to the received command 502, the SFC engine might generate one or more commands to send 546 to the SOE engine. The SOE engine is configured to initiate and perform one or more particular operations 548 in response to the command sent from the SFC engine 546. The SFC engine might generate one or more commands to send to one or more sequencer engines 526/536/546 responsive to one or more instructions obtained by accessing 504 the sequencer RAM 410 according to various embodiments of the present disclosure, for example.

Although not shown in FIG. 4, one or more of the sequencer engines of the multiple sequencer engine might comprise command queues (e.g., command buffers) to store one or more received commands, such as sent from the SFC engine. The SFC engine might generate one or more commands which might be transferred to and stored in a command queue of a particular sequencer engine to be performed in a particular order.

According to various embodiments of the present disclosure, one or more sequencer engines might be configured to perform their respective operations without requiring access to sequencer RAM. Further, only a single sequencer RAM access might be needed for the SFC engine to generate one or more commands to configure one or more engines of the multiple sequencer engines, such as following a reset operation (e.g., following power up, system reset, etc.) of the electronic system, for example.

It should be noted from FIG. 5 that the SFC engine may delegate operations to one or more of the sequencer engines of the multiple engine sequencer, including to the SFC engine itself, to be at least partially performed in parallel with operations performed by other sequencer engines of the multiple engine sequencer. For example, a read command might be received by the SFC engine 502. The SFC engine might determine that the SXB engine, the SRP engine and the SOE engine are needed to perform operations to facilitate the read operation. The SFC engine might determine that the SFC engine, SXB engine and SOE engine are needed to be selected responsive to a received write command, for example.

According to various embodiments, each sequencer engine might execute operations 510/528/538/548 independently from each other sequencer engine. Each sequencer engine might execute operations in parallel with one or more other sequencer engines. Sequencer engine operations might be executed at least partially concurrently with operations executed by other sequencer engines. For example, operations performed by two sequencer engines might be initiated and completed at the same time. Two sequencer engine operations might be initiated at different times and completed at different or at the same time. Thus, according to various embodiments of the present disclosure, sequencer engine operations might be performed at least partially concurrently with operations performed by other sequencer engines.

Figure 6:
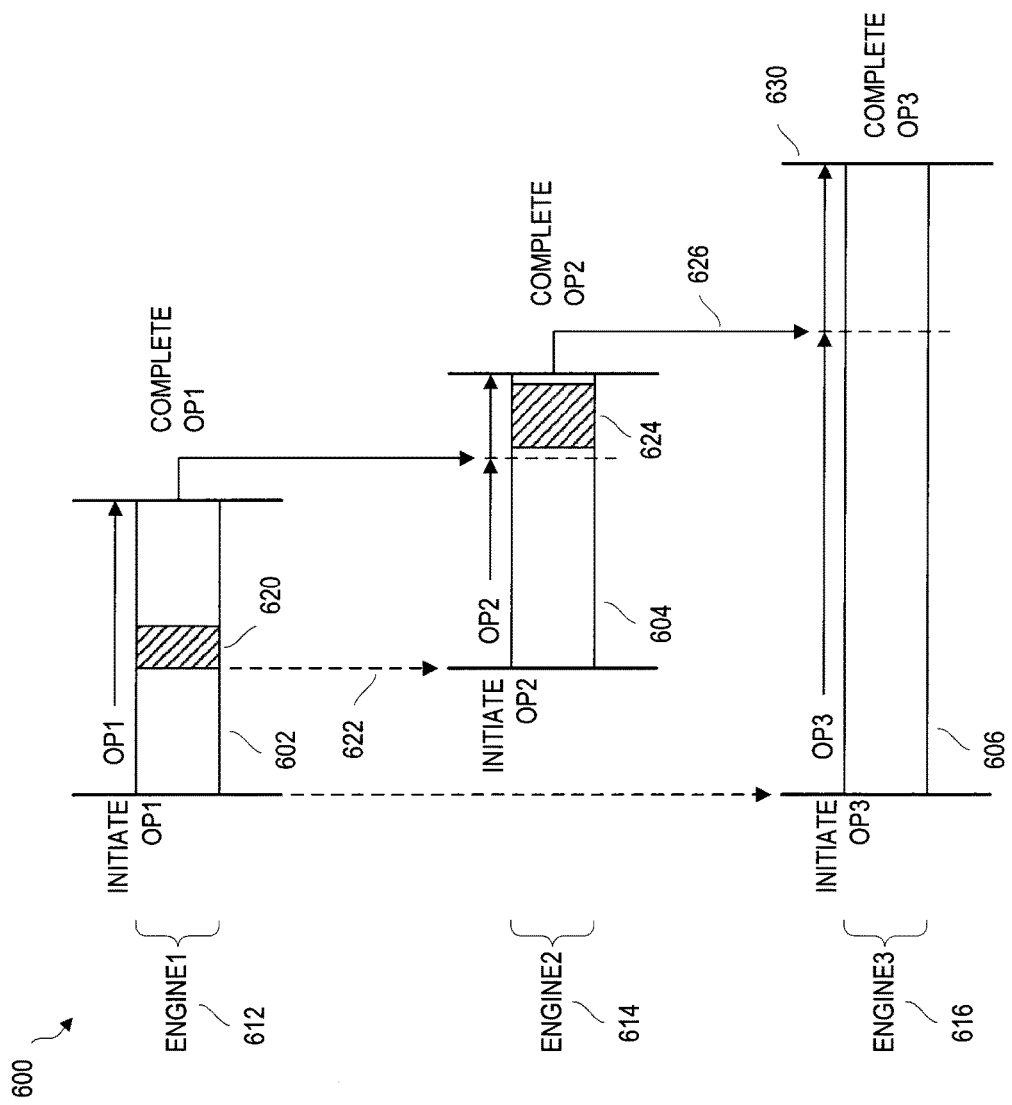
FIG. 6 illustrates a graphical representation of a number of operations performed according to an embodiment of the present disclosure.

FIG. 6 illustrates a timeline of performing a plurality of sequencer engine operations 600 performed by three different sequencer engines ENGINE1-ENGINE3 612-616 such as might comprise a memory interface operation in a memory interface according to various embodiments of the present disclosure. For example, the three sequencer engine operations performed by ENGINE1-ENGINE3 612-616 might be performed each time the memory interface receives a memory read command from a processor. A different set of operations might be performed each time a memory write command is received by the memory interface, for example. Each operation might comprise one or more steps (not shown) which are performed by the respective sequencer engines.

The execution of the operations illustrated by FIG. 6 are in contrast to the strictly serial execution of operations such as discussed above and shown in FIG. 2. The various operations of the memory interface operation illustrated by FIG. 6 show that one or more operations might be initiated prior to completing a previous operation which is in contrast to what is shown in FIG. 2. FIG. 6 illustrates a plurality of operations OP1-OP3 602-606, such as might be executed in the memory interface in response to a memory read command received by the multiple engine sequencer according to one or more embodiments of the present disclosure. Although FIG. 6 illustrates executing only three operations executed by three engines, various embodiments according to the present disclosure are not so limited. For example, a multiple engine sequencer according to various embodiments might comprise two or more sequencer engines. According to one or more embodiments, a particular engine of the multiple engine sequencer might perform more than one operation.

By way of example, the three operations OP1-OP3 602-606 shown in FIG. 6 might comprise a memory interface operation, such as to facilitate a memory read operation in a memory device 308 coupled to the memory interface 306 shown in FIG. 3. FIG. 6 illustrates that one or more operations might be initiated prior to completing a previous operation. The memory read operation might require that the operations OP1-OP3 602-606 be completed, but not necessarily initiated, in a particular order. For example, OP1 602 might need to be completed before OP2 604 is completed and OP2 604 might need to be completed before OP3 606 is completed. Thus, a particular engine, such as the SFC engine, might inhibit an engine performing OP2 604 from completing its operation prior to the completion of OP1 602 being performed by a different engine, for example. Each operation OP1-OP3 602-606 is not required to be initiated in a particular order as is the case with the serially performed operations of a single threaded execution engine as discussed above with respect to FIG. 2.

Referring again to FIG. 6, each of the three operations OP1-OP3 602-606 might be performed by a different engine ENGINE1-ENGINE3 612-616, such as the SFC, SXB, SRP and SOE engines discussed above with respect to FIG. 4, for example. Thus, ENGINE1 612 of FIG. 6 might initiate a portion (e.g., OP1 602) of a memory interface operation to be performed. Concurrently with or prior to the completion of OP1 602, ENGINE2 614 might initiate 622 a different portion (e.g., OP2 604) of the memory interface operation. Thus, according to various embodiments of the present disclosure, multiple sequencer engines might at least partially perform operations at least partially in parallel with other sequencer engines of the multiple engine sequencer.

The operation performed by ENGINE2 614 might be initiated in response to a delay (e.g., expected delay) 620 which may occur during the execution of OP1 602 performed by ENGINE1 612. For example, ENGINE2 614 might initiate executing its operation at substantially the same time 622 as the delay 620 is expected to occur during the execution of OP1. However, various embodiments are not so limited. According to one or more embodiments, ENGINE2 614 might initiate executing its operation at any time from the initiation of OP1 by ENGINE1 612 to a time prior to completion of the operation performed by ENGINE1 612, for example. This provides for portions of an operation to be executed by ENGINE2 614 to be completed in preparation of the completion of OP1 executed by ENGINE1 so as to at least partially hide (e.g., mask) the delay 620.

ENGINE3 616 might perform another operation to facilitate the memory operation in addition to OP1 and OP2. ENGINE3 616 might initiate executing its operation concurrently with the initiation of executing STEP1 and/or STEP2, for example. OP3 might comprise multiple steps (not shown). One or more of these steps might be executed up to a particular point in preparation for the completion 626 of OP2. Upon completion of OP2, ENGINE3 completes executing the remaining steps of OP3 630. By executing one or more of the steps comprising OP3 prior to completion of OP2, the delay 624 is hidden. Thus, according to various embodiments of the present disclosure, the delays 620 and/or 624 might be effectively masked by performing (e.g., partially performing) other operations while the delays are occurring. Thus, the overall time needed to complete the memory interface operation has been reduced improving memory operation performance in an electronic system, for example.

One or more embodiments might be described by way of example and reference to FIGS. 3, 4 and 6. Processor 302 might generate a command to perform a write operation in the memory device 308 coupled to the crossbar 304 by the memory interface 306. Control circuitry 316 of the memory interface 306 receives the write command from the crossbar 304. The SFC engine 402 receives and interprets the received write command and determines which sequencer engines of the multiple engine sequencer 312 will be selected to facilitate performing the write operation. For example, the SFC engine 402 might command the SXB 412 engine to execute an operation to fetch data from the crossbar 304 and send it through the write pipe 330 to the memory device interface 324. As discussed above, a delay (e.g., data latency) might exist in the write pipe from the time the SXB engine is instructed to fetch the data from the crossbar until the time when the data actually reaches the memory device interface 324.

In response to this expected write data pipeline latency, the SFC engine 402 might command the SOE engine 416 to initiate performing one or more steps comprising one or more operations in preparation of the write data which will arrive following the data latency delay in the write pipe. For example, the SOE engine 416 might initiate an operation to poll the memory device 308 to determine if the memory device is ready to receive data to be written in the memory device. The SOE engine 416 might further command the memory device 308, such as through the memory device interface 324 and communications bus 326, to begin preparations for performing a write operation in the memory device. Such preparations might comprise configuring control circuitry, registers and voltage generators in the memory device (not shown in FIG. 3), for example.

Upon arrival of the data at the memory device interface 324, the SOE engine 416 completes any remaining steps of one or more operations to transfer the write data to the memory device. Thus, the portions of the operation including determining if the memory device is ready to receive data and instructing the memory device to prepare for a write operation have already been completed when the write data becomes available at the memory device interface 324. Thus, these two operations performed by the SOE engine 416 at least partially in parallel with the steps executed by the SXB engine 412 masked at least a portion or all of the data latency that occurred in the write pipeline, for example.

Again referring to FIGS. 3, 4 and 6, another example according to one or more embodiments might be described with respect to a read operation command generated by the processor 302. Control circuitry 316 of the memory interface 306 receives the read command from the crossbar 304. The SFC engine 402 of the multiple engine sequencer 312/400 interprets the received read command and determines which sequencer engines of multiple engine sequencer will be selected to facilitate performing the memory read operation. For example, the SFC engine 402 might command the SOE engine 416 and the SRP engine 414 to perform an operation to fetch data to be read from the memory device 308 and send it through the read pipe 334 to the crossbar interface 320. A delay (e.g., data latency) might exist in the read pipe from the time the SOE engine 416 is commanded to fetch data from the memory device 308 to a time when the data read from the memory device reaches the read DMUX 336. For example, there will be a delay from when the memory device is commanded to perform the read operation in the memory device and when the read data arrives at the read DMUX 336 of the memory interface 306. There will be an additional read pipeline delay from when data leaves the read DMUX 336 and traverses the read pipe 334 to the crossbar interface 320.

OP1 602 might correspond to the SOE engine operation to fetch data from the memory device 308. A delay 620 (e.g., operational delay) is shown in OP1 602 which might be representative of a delay from when the SOE engine sends a read instruction to be performed in the memory device 308 and when data might become available at the memory device interface 324. In response to the expected delay 620, the SFC engine 402 commands the SRP engine to initiate performing an operation to facilitate transferring data by way of the DMUX 336 and the read pipe 334 when the data becomes available from the memory device interface 324. The SRP engine operation is represented by OP2 604 shown in FIG. 6. Thus, the SFC engine 402 has initiated performing at least a portion of SRP engine operation in response to the expected delay 620 to occur while performing the SOE engine operation shown as OP1 602, for example.

A delay 624 might occur while performing the SRP engine operation OP2 604 after data has become available from the memory device interface 324. Delay 624 might be representative of a delay of data traversing between the memory device interface 324 and when the data arrives at the crossbar interface 320, such as a delay introduced by the read DMUX 336 and the read pipe 334, for example. Thus, as shown in FIG. 6, OP2 604 might be initiated responsive to an expected delay 620 whereas OP3 606 might be initiated responsive to delay 620 and/or delay 624 according to various embodiments of the present disclosure.

For example, the SFC engine 402 might command the SXB engine 412 to initiate performing one or more steps comprising one or more operations to prepare the crossbar interface 320 for the arrival of the data read from the memory device 308. The SXB might be configured to perform three particular steps in facilitating a read operation, for example. The SXB engine might initiate performing two of the three particular steps comprising the SXB operation in response to the expected delay 620 and/or delay 624. For example, a first step of the two particular steps might comprise the SXB engine at least beginning to configure circuitry of the crossbar interface 320, such as data registers (not shown), for the expected arrival of data read from the memory device. A second step of the two particular steps might comprise the SXB engine indicating to the crossbar switch 304 that the memory interface 306 will soon be needing access to the crossbar switch 304 to transfer data in response to the read command generated by the processor 302.

Upon the arrival of the data read from the memory device 308 at the crossbar interface 320, the SXB engine 412 then completes the remaining third step by transferring the read data to the crossbar switch 304. Thus, the steps of the SXB engine operation including preparing the crossbar interface for the arrival of data from the memory device interface and preparing the crossbar interface for transmitting the read data to the crossbar switch have already been completed when the read data becomes available, such as indicated at line 626. Thus, the one or more operations performed by the SXB engine 412 at least partially in parallel with OP1 602 performed by the SOE engine 416 and OP2 604 performed by the SRP engine 414 have masked at least a portion of the expected delay 620 and/or delay 624 according to one or more embodiments of the present disclosure. For example, performing at least a portion of OP2 604 and performing at least a portion of OP3 606 overlap the occurrence of delay 620 of OP1 602. Further, the performance of at least a portion of OP3 606 overlaps the occurrence of delay 624 of OP2 604. Alternately stated, the occurrence of delay 620 of OP1 602 overlaps at least a portion of performing OP2 604 and at least a portion of performing OP3 606, and the occurrence of delay 624 overlaps at least a portion of performing OP3 606, for example. The completion of the operation 630 performed by the SXP engine (e.g., OP3 606) might be considered to have occurred when all of the requested read data has been transferred to the crossbar switch 304 from the crossbar interface 320, for example.

Figure 7:
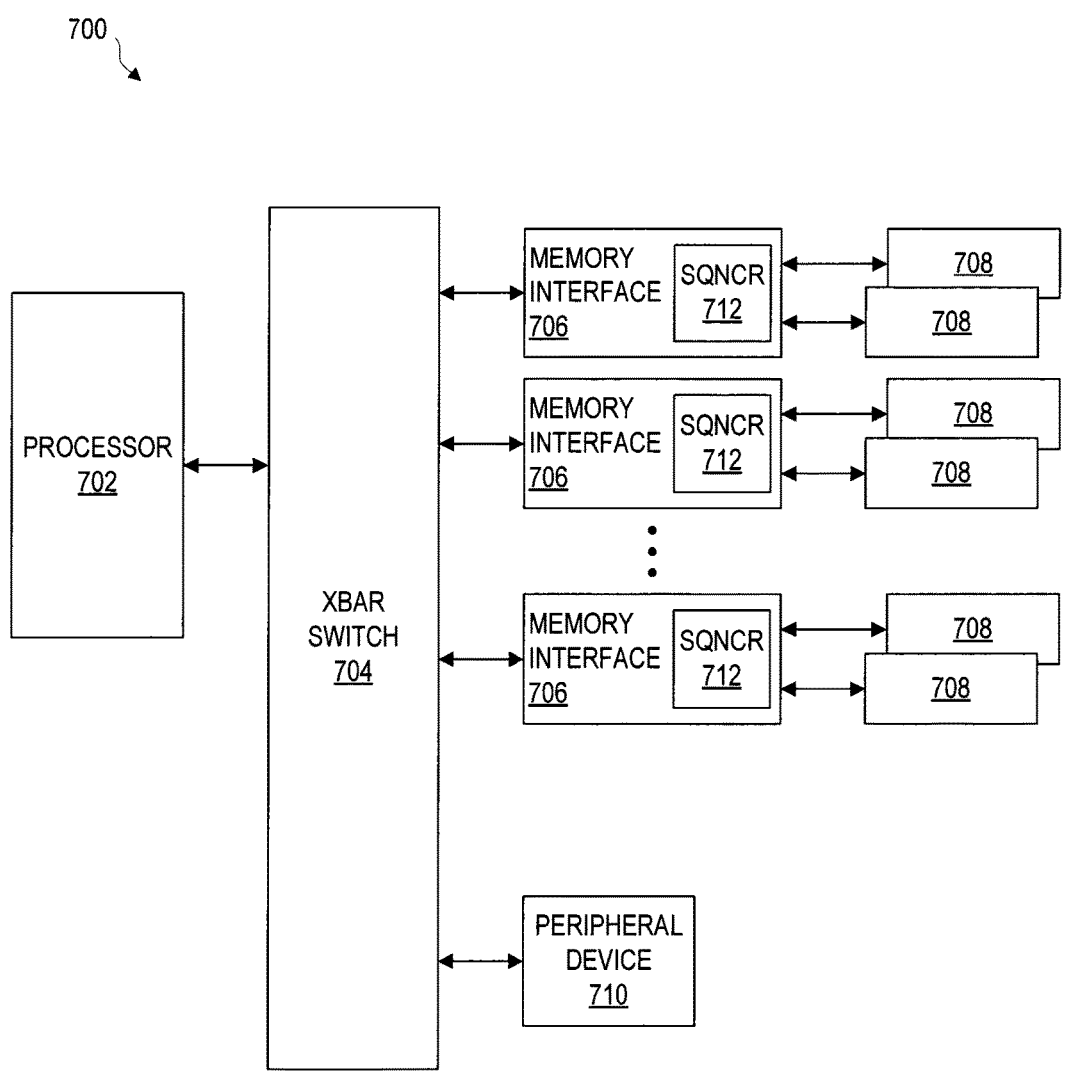
FIG. 7 is a simplified block diagram of an electronic system including a plurality of memory interfaces according to an embodiment of the present disclosure.

FIG. 7 illustrates a simplified block diagram of an electronic system 700 having a plurality of memory interfaces 706 according to various embodiments of the present disclosure. A processor 702 is coupled to each memory interface 706 by way of a crossbar (XBAR) switch 704. The processor 702 might be further coupled to one or more peripheral devices 710 by the crossbar switch 704.

Each memory interface 706 might comprise a memory interface such as memory interface 306 discussed above with respect to FIG. 3. The memory interfaces 706 might comprise sequencers (SQNCR) 712, such as multiple engine sequencers discussed above with respect to FIGS. 3 and 4 according to various embodiments of the present disclosure, for example. Sequencer RAM (not shown) of the sequencers 712 shown in FIG. 7 might be individually programmed with memory type specific instructions to interface with different types of memory devices 708 which might be coupled to each individual memory interface 706. This facilitates using one or more types of memory within the same electronic system. For example, an electronic system might comprise both volatile and non-volatile memory according to various embodiments of the present disclosure. One or more memory devices 708 might be coupled to each of a respective the memory interface 706. Memory devices 708 might comprise one or more of random-access memory (RAM) devices, read only memory (ROM) devices, dynamic random access memory (DRAM) devices, synchronous dynamic random access memory (SDRAM) devices, double data rate memory (DDR) devices, low power double data rate memory (LPDDR) devices, phase change memory (PCM) devices and Flash memory devices, for example.

The electronic system illustrated in FIG. 7 has been simplified to facilitate a basic understanding of the features of the system according to various embodiments of the present disclosure and is for purposes of illustration only. A more detailed understanding of internal circuitry and functions of non-volatile memories are known to those skilled in the art.

CONCLUSION

Memory interfaces having multiple engine sequencers and methods of operating such memory interfaces have been described. In particular, multiple engine sequencers are operable to perform one or more operations at least partially in parallel with other operations to facilitate a reduction in delays in memory interfaces comprising such sequencer engines.

Although specific embodiments have been illustrated and described herein, it will be appreciated by those of ordinary skill in the art that any arrangement, which is calculated to achieve the same purpose, may be substituted for the specific embodiments shown. Many adaptations of the disclosure will be apparent to those of ordinary skill in the art. Accordingly, this application is intended to cover any adaptations or variations of the disclosure.

What is claimed is:

1. A multiple engine sequencer, comprising:
   a first engine to facilitate transfer of data across a first interface for transfer of the data to or from a memory device;
   a second engine, different from the first engine, to facilitate transfer of data from a second interface to the first interface for transfer of the data to the memory device;
   a third engine, different from the first engine and the second engine, to facilitate transfer of data from the first interface to the second interface for transfer of the data from the memory device; and
   a flow control engine in communication with the first engine, the second engine and the third engine, wherein the flow control engine is configured to determine if performance of at least a portion of a memory operation corresponding to a command received at the multiple engine sequencer should be delegated to a different engine of the multiple engine sequencer selected from a group consisting of the first engine, the second engine and the third engine.

2. The multiple engine sequencer of claim 1, wherein the flow control engine is configured to perform at least one of a branch operation, a jump operation and a comparison operation.

3. The multiple engine sequencer of claim 1, wherein the flow control engine being configured to determine if performance of at least a portion of a memory operation should be delegated to a different engine of the multiple engine sequencer comprises the flow control engine being configured to determine if the portion of the memory operation should be performed by the flow control engine or if performance of the portion of the memory operation should be delegated to the different engine.

4. The multiple engine sequencer of claim 1, wherein the flow control engine is further configured to activate the different engine responsive to determining that performance of the at least a portion of the memory operation should be delegated to the different engine.

5. The multiple engine sequencer of claim 1, wherein the flow control engine is further configured to initiate performance of the at least a portion of the memory operation by the different engine responsive to determining that performance of the at least a portion of the memory operation should be delegated to the different engine.

6. The multiple engine sequencer of claim 1, wherein the flow control engine is further configured to inhibit the different engine from completing the at least a portion of the memory operation after performance of the at least a portion of the memory operation has been initiated.

7. The multiple engine sequencer of claim 1, wherein the first engine comprises a crossbar engine.

8. The multiple engine sequencer of claim 1, wherein the second engine comprises a read pipe engine.

9. The multiple engine sequencer of claim 1, wherein the third engine comprises an Open NAND Flash Interface (ONFI) engine.

10. The multiple engine sequencer of claim 1, wherein the first interface is an interface for communication with a crossbar switch and the second interface is an interface for communication with the memory device.

11. A multiple engine sequencer, comprising:
    a flow control engine responsive to a received command to perform an operation;
    a first additional engine configured to perform a first portion of the operation responsive to one or more first commands from the flow control engine; and
    a second additional engine configured to perform a second portion of the operation responsive to one or more second commands from the flow control engine;
    wherein the first additional engine and the second additional engine are configured to at least partially perform their respective portions of the operation at least partially in parallel; and
    wherein the flow control engine is configured to inhibit the second additional engine from performing the second portion of the operation to completion until a time subsequent to the completion of the first portion of the operation.

12. The multiple engine sequencer of claim 11, wherein the multiple engine sequencer is configured to delegate performance of the first portion of the operation to the first additional engine and to delegate performance of the second portion of the operation to the second additional engine.

13. The multiple engine sequencer of claim 11, wherein the flow control engine is configured to perform a third portion of the operation and further wherein the first additional engine, second additional engine and flow control engine are configured to perform their respective portions of the operation at least partially in parallel.

14. The multiple engine sequencer of claim 11, wherein the multiple engine sequencer is configured to initiate performance of the second portion of the operation after initiation of the first portion of the operation and prior to completion of the first portion of the operation.

15. The multiple engine sequencer of claim 11, wherein the multiple engine sequencer is configured to initiate performance of the second portion of the operation concurrently with the completion of the first portion of the operation.

16. The multiple engine sequencer of claim 11, wherein the multiple engine sequencer is configured to initiate performance of the second portion of the operation in response to a delay during performance of the first portion of the operation.

17. The multiple engine sequencer of claim 16, wherein the multiple engine sequencer being configured to initiate performance of the second portion of the operation in response to a delay during performance of the first portion of the operation comprises the flow control engine being configured to initiate performance of the second portion of the operation at substantially a same time as the delay is expected to occur during the performance of the first portion of the operation.

18. The multiple engine sequencer of claim 16, wherein the multiple engine sequencer being configured to initiate performance of the second portion of the operation in response to a delay during performance of the first portion of the operation comprises the flow control engine being configured to initiate performance of the second portion of the operation at a time prior to completion of the first portion of the operation.

19. The multiple engine sequencer of claim 11, wherein the flow control engine is configured to determine which of the engines will be selected to facilitate performing a memory operation corresponding to the received command.

20. The multiple engine sequencer of claim 11, wherein the first portion of the operation is different than the second portion of the operation.

21. A memory interface, comprising:
a first sequencer engine, wherein the first sequencer engine is configured to perform a first operation;
a second sequencer engine different from the first sequencer engine, wherein the second sequencer engine is configured to perform a second operation; and
a third sequencer engine different from the first sequencer engine and the second sequencer engine, wherein the third sequencer engine is configured to initiate performance of the first operation by the first sequencer engine, and is configured to initiate performance of the second operation by the second sequencer engine in response to an operational delay which occurs during performance of the first operation, wherein the operational delay occurs as a result of performing the first operation.

22. The memory interface of claim 21, wherein the operational delay comprises an operational delay expected to occur while the first operation is performed.

23. The memory interface of claim 21, wherein the third sequencer engine is configured to initiate performance of the first operation by the first sequencer engine responsive to a command received from a processor coupled to the memory interface.

24. The memory interface of claim 23, wherein the received command corresponds to a memory operation to be performed in a memory device coupled to the memory interface.

25. The memory interface of claim 21, wherein the third sequencer engine is further configured to inhibit the completion of the second operation prior to the completion of the first operation.

26. The memory interface of claim 21, wherein the first sequencer engine is configured to initiate performance of the first operation in response to activation of the first sequencer engine;
wherein the second sequencer engine is configured to initiate performance of the second operation in response to activation of the second sequencer engine; and
wherein the third sequencer engine is configured to activate the first sequencer engine, and is configured to activate the second sequencer engine in response to the operational delay.

27. The memory interface of claim 21, further comprising a data pipeline.

28. The memory interface of claim 27, further comprising a memory interface input and a memory interface output, wherein the data pipeline is coupled between the memory interface input and the memory interface output.

29. The memory interface of claim 27, wherein the operational delay comprises an operational delay which occurs in the data pipeline.

30. The memory interface of claim 27, wherein the data pipeline comprises one of a read data pipeline or a write data pipeline.

31. The memory interface of claim 21, wherein the operational delay comprises one of a data read latency delay or a data write latency delay.

32. The memory interface of claim 21, wherein the third sequencer engine is further configured to enable the second sequencer engine to complete the second operation responsive to the completion of the first operation.

33. The memory interface of claim 21, wherein each of the first, second and third sequencer engines are configured to operate concurrently with at least one other of the first, second and third sequencer engines.

34. The memory interface of claim 21, further comprising:
a first interface;
a second interface; and
a RAM memory device coupled to the third sequencer engine.

35. The memory interface of claim 34, further comprising a data pipeline coupled between the first interface and the second interface.

36. The memory interface of claim 34, wherein the first interface comprises a crossbar switch interface.

37. The memory interface of claim 34, wherein the second interface comprises a memory device interface.

38. The memory interface of claim 34, wherein the second interface comprises an Open NAND Flash Interface (ONFI).

39. The memory interface of claim 34, wherein the third sequencer engine is further configured to read one or more commands stored in the RAM memory device and to selectively configure each of the first, second and third sequencer engines responsive to the one or more commands read from the RAM memory device.

40. A method of operating a memory interface, the method comprising:
initiating performance of a first operation by a first sequencer engine; and
initiating performance of a second operation by a second sequencer engine, different from the first sequencer engine, responsive to an operational delay which occurs during performance of the first operation;
wherein performance of the first operation includes fetching data for transfer of the fetched data to or from a memory device coupled to the memory interface;

wherein performance of the second operation includes transferring the fetched data across a read pipeline of the memory interface when the transfer of the fetched data is from the memory device, and transferring the fetched data across a write pipeline of the memory interface when the transfer of the fetched data is to the memory device; and wherein the performance of the second operation is initiated from a time when the performance of the first operation is initiated to a time when the operational delay is expected to occur.

41. The method of claim 40, further comprising determining the operational delay prior to initiating performance of the first operation by the first sequencer engine and where the operational delay comprises an expected operational delay.

42. The method of claim 40, wherein initiating performance of the second operation further comprises initiating performance of the second operation concurrently with an occurrence of the operational delay occurring while performing the first operation.

43. The method of claim 40, wherein initiating performance of the first operation further comprises initiating performance of the first operation responsive to a command received from a processor coupled to the memory interface, where the received command corresponds to a memory device operation to be performed in the memory device coupled to the memory interface.

44. The method of claim 43, wherein the received command corresponds to one of a memory device read operation or a memory device write operation.

45. The method of claim 40, wherein initiating performance of the second operation further comprises initiating performance of the second operation concurrently with initiating performance of the first operation.

46. The method of claim 40, wherein initiating performance of the second operation further comprises initiating performance of the second operation concurrently with a start of an occurrence of the operational delay.

47. The method of claim 40, wherein initiating performance of the second operation further comprises initiating performance of the second operation subsequent to initiating performance of the first operation.

48. The method of claim 40, further comprising inhibiting the second sequencer engine from completing the second operation prior to completing the first operation.

49. The method of claim 40, further comprising initiating performance of a third operation by a third sequencer engine responsive to the operational delay which occurs during performance of the first operation.

50. The method of claim 40, further comprising initiating performance of a third operation by a third sequencer engine responsive to a different operational delay which occurs during performance of the second operation.

* * * * *